(12) United States Patent
Pal et al.

(10) Patent No.: US 11,889,421 B2
(45) Date of Patent: Jan. 30, 2024

(54) SSB SET SELECTION FOR DRX

(71) Applicant: QUALCOMM Incorporated, San Diego, CA (US)

(72) Inventors: Arnab Pal, Hyderabad (IN); Jun Zhu, San Diego, CA (US); Yongle Wu, San Diego, CA (US); Scott Hoover, Del Mar, CA (US); Joshua Tennyson MacDonald, Superior, CO (US); Uzma Khan Qazi, San Diego, CA (US); Vishnu Namboodiri Karakkad Kesavan Namboodiri, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 84 days.

(21) Appl. No.: 17/644,773

(22) Filed: Dec. 16, 2021

(65) Prior Publication Data

US 2023/0199650 A1 Jun. 22, 2023

(51) Int. Cl.
*H04W 52/02* (2009.01)

(52) U.S. Cl.
CPC .............................. *H04W 52/0229* (2013.01)

(58) Field of Classification Search
CPC .......... H04W 52/0229; H04W 52/0216; Y02D 30/70
See application file for complete search history.

(56) References Cited

U.S. PATENT DOCUMENTS

2020/0162939 A1\* 5/2020 Kim ..................... H04W 56/001
2021/0112536 A1\* 4/2021 Shah ..................... H04L 5/0048

\* cited by examiner

*Primary Examiner* — Marcos L Torres
(74) *Attorney, Agent, or Firm* — Procopio, Cory, Hargreaves & Savitch LLP

(57) ABSTRACT

A base station may configure a user equipment (UE) with a discontinuous reception (DRX), e.g., connected mode DRX (CDRX), and the UE may select a synchronization signal block (SSB) set to perform an SSB warm-up to wake up, search, and measure the SSB set to improve the performance of the UE during a DRX ON duration. The UE may select the SSB set based on a time difference of the SSB set relative to the DRX ON duration. The UE may be configured to wake up to measure one of a first SSB set or a second SSB set having a smaller time difference relative to the DRX ON duration.

22 Claims, 13 Drawing Sheets

910 receive timing information for the first SSB set having a first time difference relative to a DRX ON duration and the second SSB set having a second time difference relative to the DRX ON duration

916 wake up to measure one of the first SSB set or the second SSB set having a smaller time difference relative to the DRX ON duration

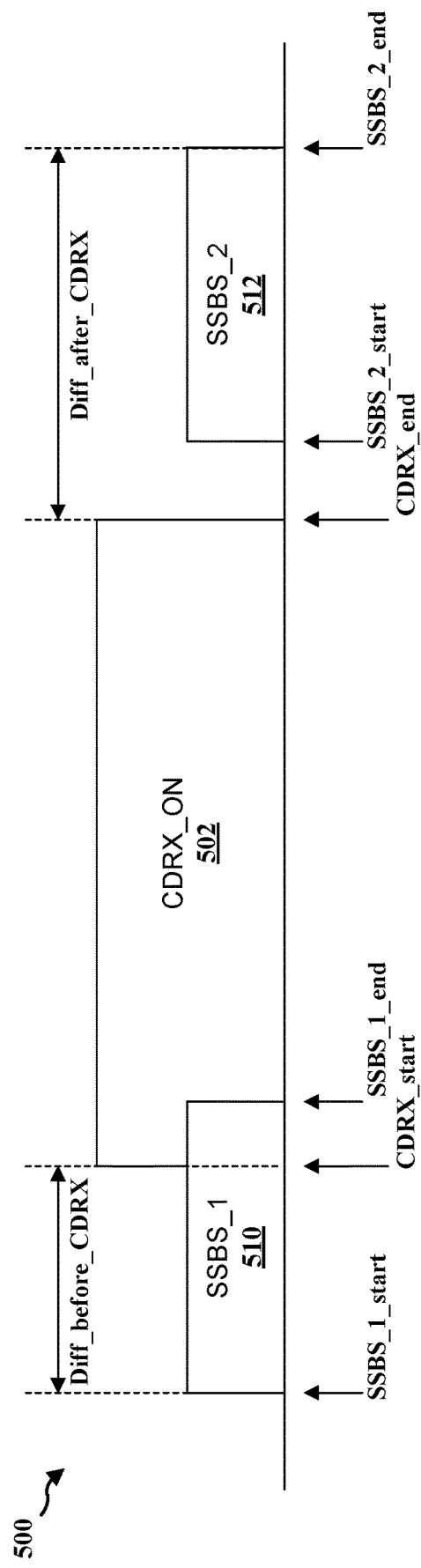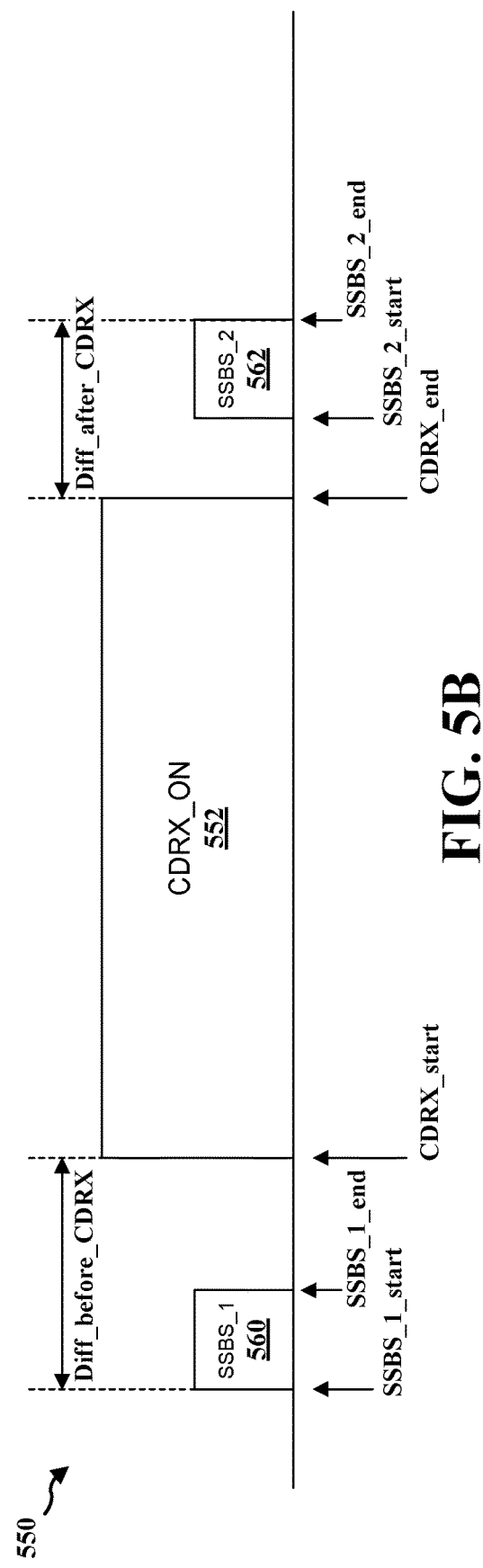
FIG. 5A
FIG. 5B

SSB SET SELECTION FOR DRX

TECHNICAL FIELD

The present disclosure relates generally to communication systems, and more particularly, to a method of wireless communication including a discontinuous reception (DRX) with improved synchronization signal block (SSB) warm-up process.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a user equipment (UE) and a base station. The base station may configure the UE with a discontinuous reception (DRX), e.g., connected mode DRX (CDRX), and the UE may select a synchronization signal block (SSB) set to perform an SSB warm-up to wake up, search, and measure the SSB set to improve the performance of the UE during a DRX ON duration. The UE may select the SSB set based on a time difference of the SSB set relative to the DRX ON duration. The UE may be configured to wake up to measure one of a first SSB set or a second SSB set having a smaller time difference relative to the DRX ON duration. The first SSB set may be configured to start before the DRX ON duration and the second SSB set may be configured to start after the DRX ON duration, and the UE may calculate the first time difference between an SSB start time of the first SSB set and a start time of the DRX ON duration and calculate the second time difference between an end time of the DRX ON duration and an SSB end time of the second SSB set.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 5A and 5B are examples of wireless communication including SSB set selection in a CDRX in accordance with aspects presented herein.

DETAILED DESCRIPTION

Figure 1:
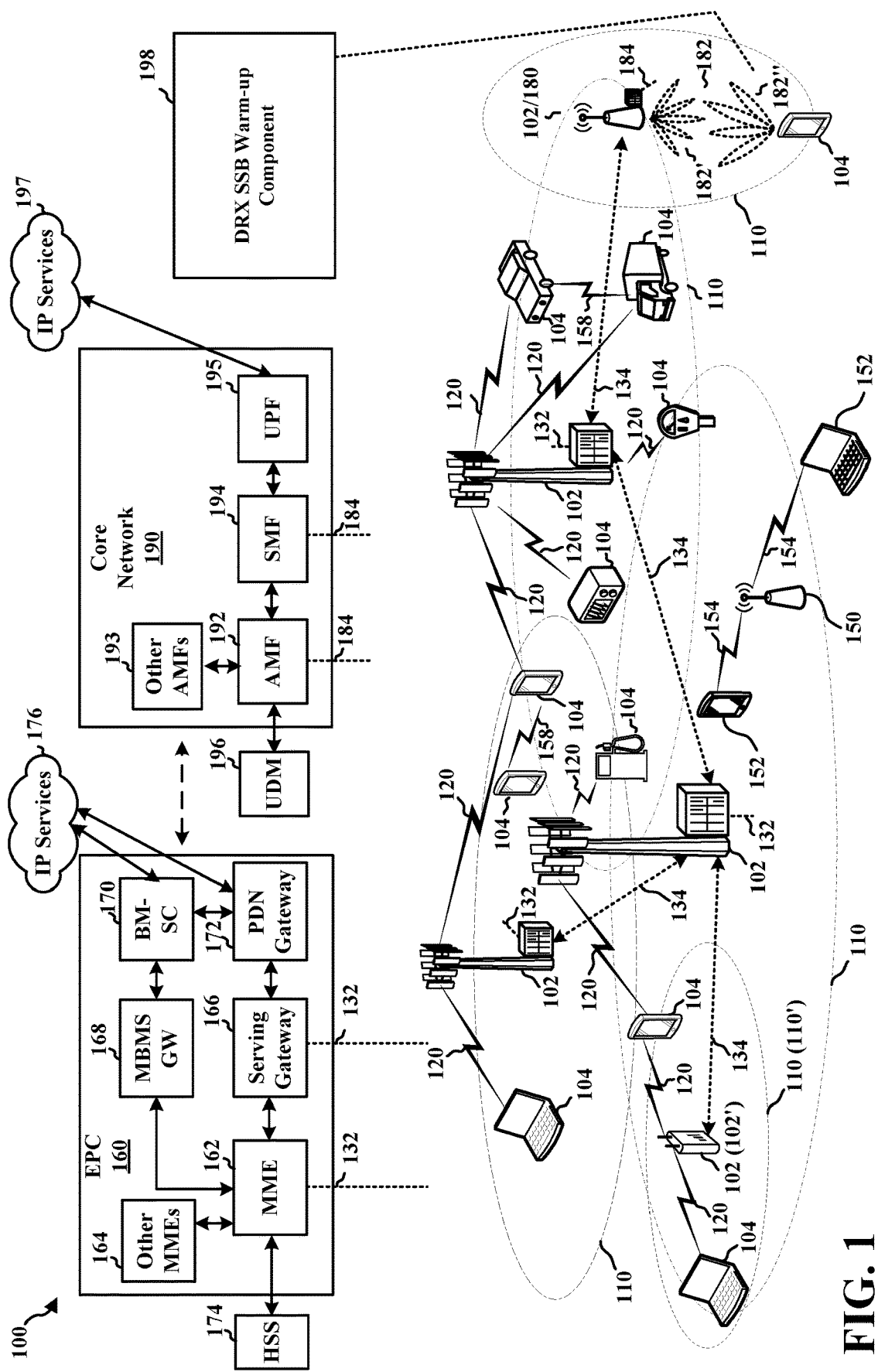
FIG. 1 is a diagram illustrating an example of a wireless communications system and an access network in accordance with aspects presented herein.

A UE configured with discontinuous reception (DRX) may perform an SSB warm-up associated with a DRX ON duration to improve the performance of the DRX process and/or reduce the overall time/frequency errors when exchanging communication during a DRX ON duration. In some aspects, the UE may be configured to perform an optimized or improved SSB set selection for performing the SSB warm-up procedure to reduce the overall wake-up duration and improve or reduce the power consumption without sacrificing performance.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100 in accordance with aspects presented herein. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a DRX SSB warm-up component 198 configured to receive timing information for a first SSB set having a first time difference relative to a DRX ON duration for the UE and for a second SSB set having a second time difference relative to the DRX ON duration for the UE, and wake up to measure one of the first SSB set or the second SSB set having a smaller time difference relative to the DRX ON duration. Although the following description may be focused on 5G NR, the concepts described herein may be applicable to other similar areas, such as LTE, LTE-A, CDMA, GSM, and other wireless technologies.

Figure 2:
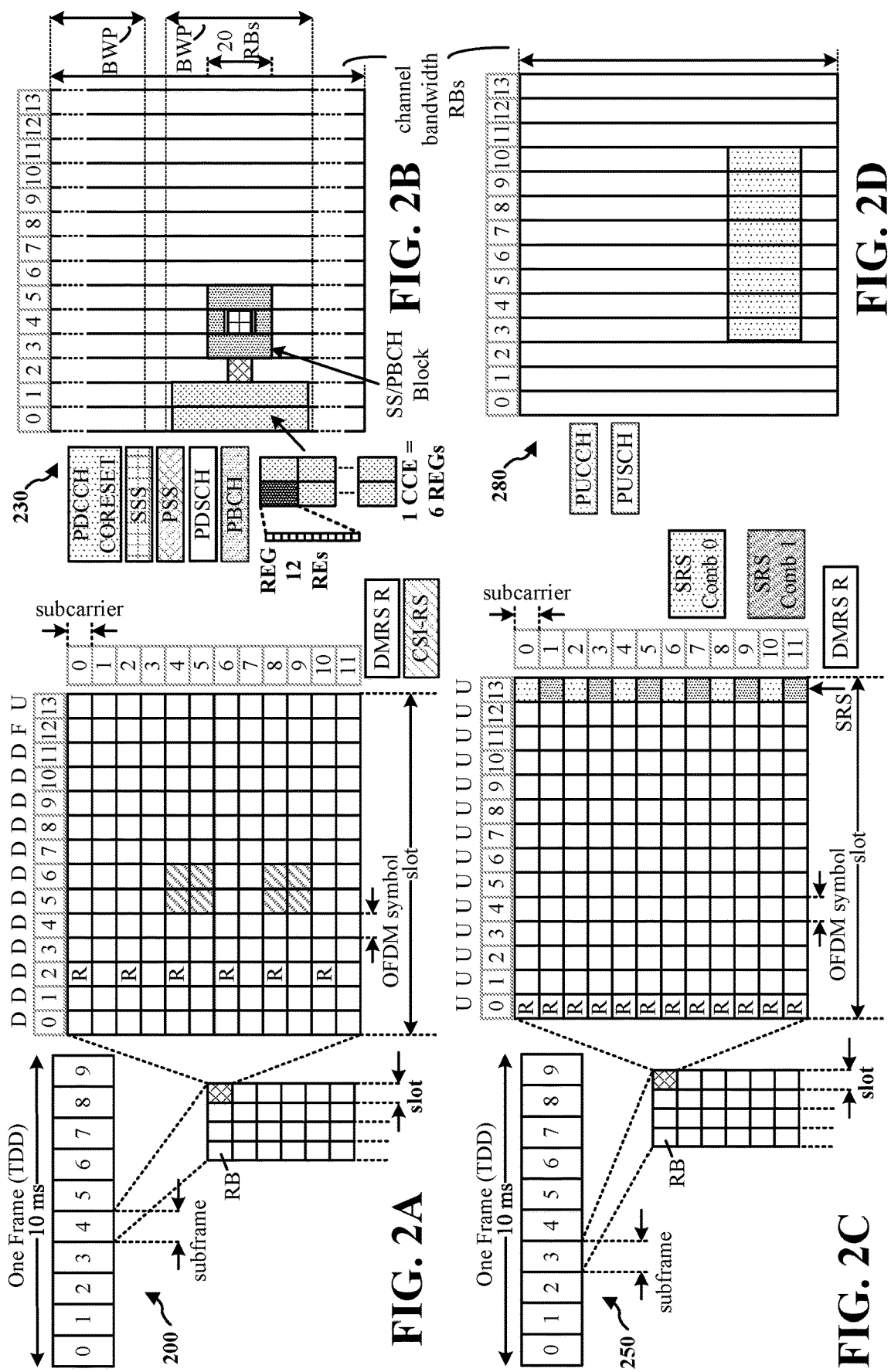
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
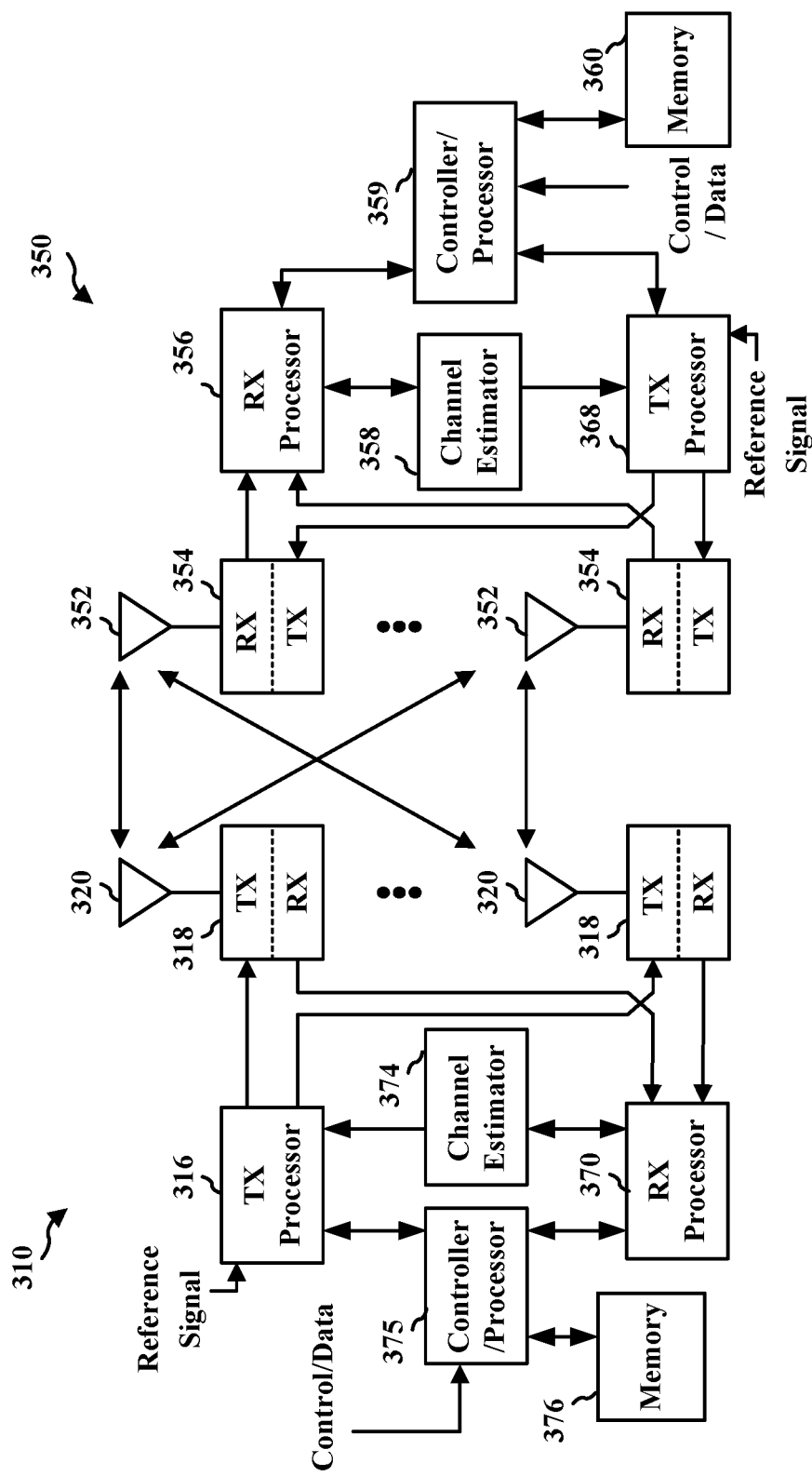
FIG. 3 is a diagram illustrating an example of a base station and user equipment (UE) in an access network in accordance with aspects presented herein.

FIG. 3 is a block diagram of a base station 310 in communication with a UE 350 in an access network in accordance with aspects presented herein. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

In 5G-NR, a user equipment (UE) may be configured to improve or reduce the power consumption as much as possible without sacrificing performance. The UE may be configured by a base station for discontinuous reception (DRX). During an RRC connected state, when there is no data transmission in either direction (UL/DL), the UE may operate using the DRX mode. In the DRX mode, the UE monitors the PDCCH channel discontinuously using a sleep and wake cycle, e.g., OFF durations and ON durations. When the UE is in an RRC connected state, the DRX may also be referred to as Connected Mode DRX (CDRX). DRX conserves battery power at the UE. In a non-DRX mode, the UE monitors for PDCCH in each subframe to check whether there is downlink data available. Continuous monitoring of the PDCCH uses more battery power at the UE.

Figure 13:
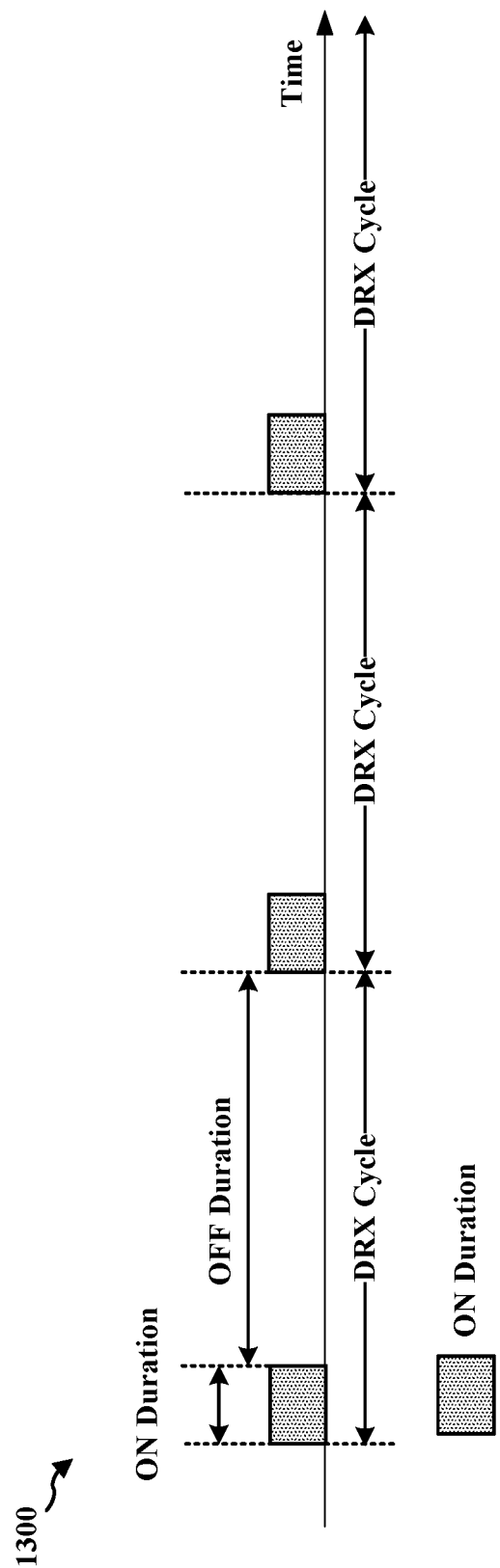
FIG. 13 is a diagram illustrating DRX operation in accordance with aspects presented herein.

The UE may receive a DRX configuration from the network in RRC signaling from a base station, such as in an RRC Connection Setup request or an RRC connection reconfiguration request. A DRX configuration may include the configuration of one or more timers and values. In some examples, the DRX configuration may include any of an ON duration Timer, a DRX inactivity timer, a DRX retransmission timer, a DRX UL retransmission timer, a long DRX cycle, a value of the DRX start offset, a DRX short cycle timer, and/or a short DRX cycle, among others. A DRX cycle may comprise a periodic repetition of an on duration in which the UE monitors for PDCCH from the base station and an off duration. FIG. 13 illustrates an example of a DRX cycle 1300 including periodic ON durations during which the UE monitors for PDCCH and OFF durations during which the UE may not monitor for the PDCCH. The OFF duration may be referred to as a DRX opportunity. During the OFF duration, the UE does not monitor for PDCCH. The UE may enter a sleep mode or a low power mode in which the UE minimizes power consumption by shutting down a radio frequency (RF) function without detecting communication from the base station.

The ON duration timer may correspond to a number of consecutive PDCCH subframes to be monitored or decoded when the UE wakes up from the OFF duration in the DRX Cycle. The DRX retransmission timer may correspond to a consecutive number of PDCCH subframes for the UE to monitor when a retransmission is expected by the UE. The DRX inactivity timer may correspond to an amount of time before the UE may again enter the OFF duration following successfully decoding PDCCH. The amount of time may be in terms of a transmission time interval (TTI) duration. After a UE successfully receives downlink data, the DRX Inactivity Timer may start counting a number of subframes. If any uplink or downlink data transmissions occur while the DRX inactivity timer is running, the timer restarts. If the DRX inactivity timer expires without uplink or downlink activity, the UE may enter the DRX cycle to achieve power savings. The UE may start with a short DRX cycle In one aspect, the UE may be configured with a CDRX with a CDRX ON duration during which the UE is awake or turned on to receive and decode signal from the base station, and a CDRX OFF duration during which the UE may enter a sleep mode, a low power mode, skip monitoring for communication, or turn off at least some components to save power. In the CDRX configuration, the network including the base station may configure the UE with a long duration of CDRX OFF duration to conserve power at the UE.

The base station may configure the UE with one or more parameters for the CDRX. For example, the network may configure the UE with a particular CDRX cycle. The network may configure the parameters for CDRX via a radio resource control (RRC) message. That is, the base station may transmit an RRC message including the CDRX configuration to the UE, and the UE may be configured with the CDRX based on the RRC message received from the base station. In one aspect, the base station may configure the UE with particular CDRX cycle.

Figure 4:
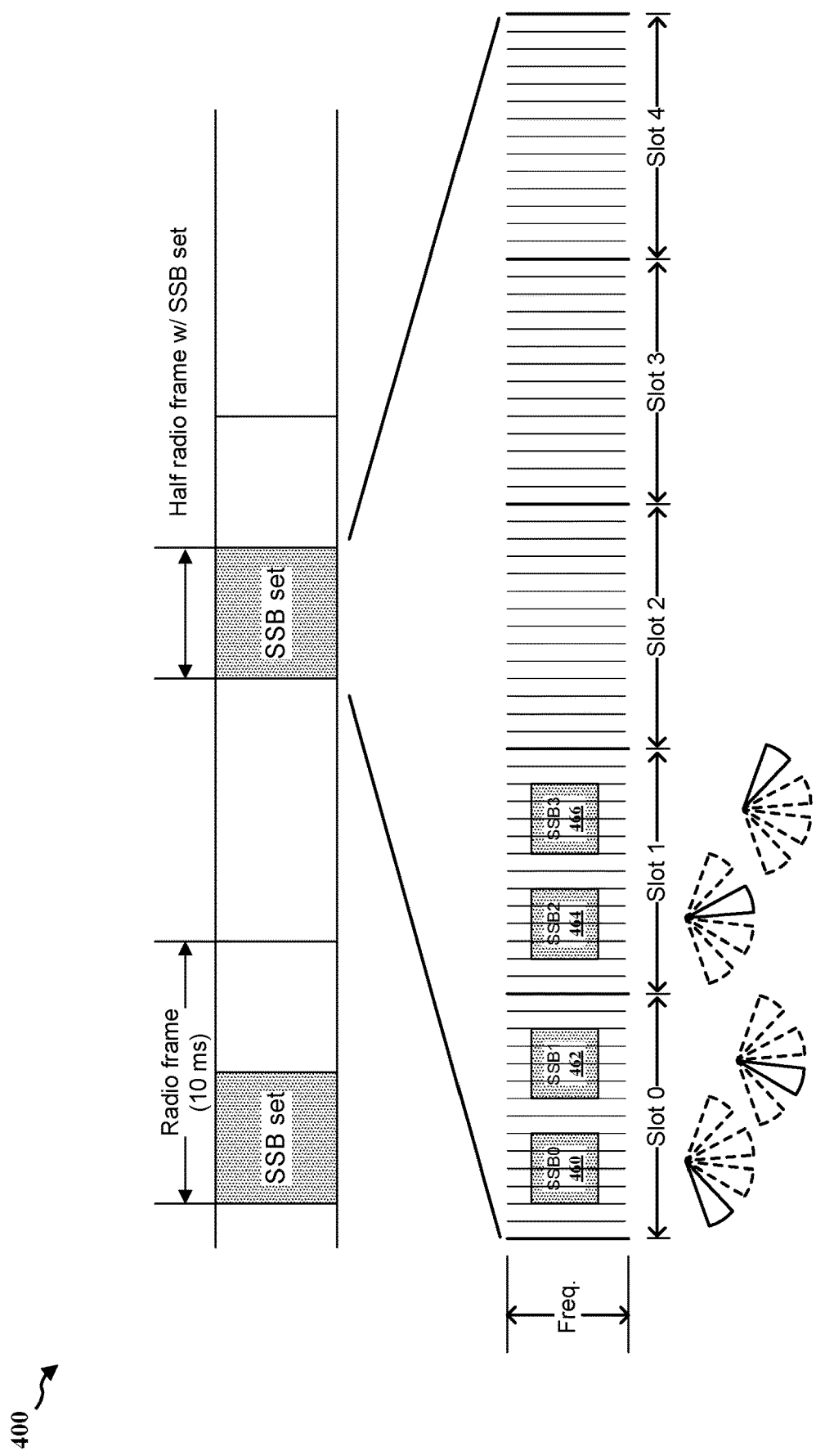
FIG. 4 illustrates an example of SSB set, in accordance with various aspects of the present disclosure in accordance with aspects presented herein.

FIG. 4 illustrates an example 400 of synchronization signal block (SSB) sets, in accordance with various aspects of the present disclosure in accordance with aspects presented herein. The base station may transmit the SSBs on different beams in different directions in a time division multiplexing (TDM) fashion. In one aspect, the base station may be configured to transmit SSB sets, and each SSB set may include multiple SSBs, where the multiple SSBs are transmitted on different beams sequentially in different directions. The example 400 of SSB sets shows that half of a radio frame is configured with the SSB beam-sweeping, and first two slots are configured with four SSBs; a first SSB 460, a second SSB 462, a third SSB 464, and a fourth SSB 466. The base station may sequentially transmit the first SSB 460 on a first beam in a first direction, the second SSB 462 on a second beam in a second direction, the third SSB 464 on a third beam in a third direction, and the fourth SSB 466 on a fourth beam in a fourth direction.

To keep or improve the decoding rate of the DL/UL channel at the CDRX ON and maintain the UE mobility, UE may be configured to occasionally wakeup to search and measure an SSB set in connection with the CDRX. In some aspects, the UE may schedule, or perform, an SSB warm-up before or associated with the CDRX ON duration to maintain improved performance and/or reduce the overall time/frequency errors at the UE when exchanging communication with the base station, e.g., during a DRX ON duration. That is, the UE may perform the SSB warm-up to periodically or aperiodically wake up, search, and measure the SSB set to improve the performance of the UE during the CDRX ON duration. For example, the SSB warm-up may include a frequency tracking loop (FTL) or time tracking loop (TTL) (FTL/TTL) to correct the time and/or frequency errors in receiving or transmitting DL/UL channels, and improve the performance of wireless communication during the DRX ON duration.

As the UE wakes up to perform search for a measure an SSB, the SSB warm-up may consume additional power at the UE, e.g., in terms of waking up for additional time within a DRX OFF duration. That is, as the UE may be configured to wake up from the CDRX OFF duration to perform the SSB warm-up procedure, the SSB warm-up procedure during the CDRX OFF duration may increase the power consumption in the UE.

In some aspects, the SSB set warm-up may be configured and scheduled before the CDRX ON duration regardless of one or more CDRX parameters including the CDRX cycle length, CDRX ON duration, SSBS/SMTC periodicity, CDRX offset, etc.

In another aspect, the UE may be provided with an algorithm to improve the scheduling of the intra-frequency activities in the CDRX. That is, the UE may apply an improved SSB set selection procedure to reduce the power consumption for SSB warm-up with response to the scheduled CDRX ON duration. The UE may be configured with a process of selecting the SSB set for the SSB warm-up with a reduced power consumption without deteriorating the UE performance. The process of selecting the SSB set for the SSB warm-up may reduce the overall power consumption for the UE to turn on at least a part of the UE to receive the SSB set in connection with the power consumption from the scheduled CDRX ON duration.

FIGS. 5A and 5B are examples 500 and 550 of wireless communication including SSB set selection in a CDRX in accordance with aspects presented herein. In some aspects, the UE may receive timing information for a first SSB set having a first time difference relative to the CDRX ON duration and a second SSB set having a second time difference relative to the CDRX ON duration, and select one of the first SSB set or the second SSB set to wake up to measure the one of the first SSB set or the second SSB set having a smaller time difference relative to the CDRX ON duration.

The UE may calculate the two locations of the first SSB set and the second SSB set that are the closest to the CDRX ON duration. For example, the first SSB set may be configured to start before a start of the CDRX ON duration and the second SSB set may be configured to start after the start of the CDRX ON duration. The UE may calculate a first time difference between the first SSB set and the CDRX ON duration and a second time difference between a second SSB set and the CDRX ON duration.

In one aspect, the first time difference (Diff_before_DCRX) between the first SSB set and the CDRX ON duration may be calculated as a timing difference between a start of the first SSB set (SSBS_1_start) and the start of the CDRX ON duration (CDRX_start). That is, the first time difference between the first SSB set and the CDRX ON duration may be calculated as Diff_before_DCRX= |CDRX_start−SSBS_1_start|. As the first SSB set is configured to start before the start of the CDRX ON duration, the CDRX_start−SSBS_1_start may have a positive value.

In another aspect, the second time difference (Diff_after_DCRX) between the second SSB set and the CDRX ON duration may be calculated as a timing difference between an end of the second SSB set (SSBS_2_end) and an end of the CDRX ON duration (CDRX_end). That is, the second time difference between the second SSB set and the CDRX ON duration may be calculated as Diff_after_DCRX= |SSBS_2_end−CDRX_end|. As the second SSB set is configured to start after the start of the CDRX ON duration and the end of the second SSB may come before or after the end of the CDRX ON duration, the SSBS_2_end−CDRX_end may have either a positive value or a negative value. The UE may consider an absolute value, e.g., the positive value, of the difference between the SSBS_2_end and the CDRX_end when determining a smaller time difference between the SSBSs and the CDRX ON duration. In some aspects, the UE may consider whether the SSB set is before or after a CDRX ON duration.

In some aspect, the UE may compare the first time difference (Diff_before_DCRX) between the first SSB set and the CDRX ON duration and the second time difference (Diff_after_DCRX) between the second SSB set and the CDRX ON duration to select one of the first SSB set or the second SSB set for the SSB warm-up procedure. In one aspect, the UE may determine the smaller time difference between the first time difference and the second time difference, and choose the SSB set among the first SSB set or the second SSB set that is associated with the smaller time difference, e.g., that is closer to the CDRX ON duration and will minimize the combined length of time that the UE is in an ON state. As the selected SSB set may have a smaller timing difference from the CDRX ON duration, the UE may have a smaller wake-up duration to cover both the CDRX ON duration and the SSB warm-up procedure.

FIG. 5A illustrates a first example 500 of wireless communication including SSB set selection in a CDRX. For example, the SSB sets may be configured to have a duration of 5 ms. In one aspect, the UE may be configured to select an SSB set that directly follows the CDRX ON duration 502, and the UE may select the second SSB set 512 for the SSB warm-up procedure, which may result in a longer wake-up time, e.g., when the UE is awake and monitoring for communication, for the UE and an increased power consumption from the increased wake-up time.

In another aspect, the UE may be configured to select one of the first SSB set 510 or the second SSB set 512 based on a first time difference between the first SSB set 510 and the CDRX ON duration 502 and a second time difference between the second SSB set 512 and the CDRX ON duration 502. The UE may calculate the first time difference (Diff_before_DCRX) between the first SSB set 510 and the CDRX ON duration 502 as a timing difference between start of the first SSB set (SSBS_1_start) and the start of the CDRX ON duration (CDRX_start), e.g., Diff_before_DCRX=|CDRX_start−SSBS_1_start|. The UE may also calculate the second time difference (Diff_after_DCRX) between the second SSB set 512 and the CDRX ON duration 502 as a timing difference between an end of the second SSB set (SSBS_2_end) and an end of the CDRX ON duration (CDRX_end), e.g., Diff_after_DCRX=|SSBS_2_end−CDRX_end|. Here, the first time difference (Diff_before_DCRX) between the first SSB set 510 and the CDRX ON duration 502 is smaller than the second time difference (Diff_after_DCRX) between the second SSB set 512 and the CDRX ON duration 502, and therefore, the UE may select the first SSB set 510 for the SSB warm-up procedure, and the UE may have shorter wake-up time and reduced power consumption compared to selecting the second SSB set 512 for the SSB warm-up procedure.

In one example, the CDRX ON 502 may have a cycle of 160 ms and a 10 ms of CDRX ON duration, and the first time difference (Diff_before_DCRX) may be 2 ms and the second time difference (Diff_after_DCRX) may be 13 ms. Following table shows the advantage of the example of selecting the first SSB set 510 based on comparing the first time difference (Diff_before_DCRX) and the second time difference (Diff_after_DCRX) compared to the example of selecting the second SSB set 512.

| CDRX to SSBS offset | second SSB set | first SSB set | Saving | |
| --- | --- | --- | --- | --- |
| 2 ms Offset | 58.55 mAB | 53.12 mAB | 5.43 mAB | 9.27% |
| Average NR Awake Current | 207.37 mA | 200.01 mA | 7.36 mA | 3.55% |
| Average NR Awake Duration | 36.14 ms | 33.29 ms | 2.85 ms | 7.89% |
| Average NR Awake Penalty | 7494.88 mAms | 6658.33 mAms | 836.55 mAms | 11.16% |

FIG. 5B illustrates a second example 550 of wireless communication including SSB set selection in a CDRX. Here, the SSB sets of the second example 550 may have a shorter duration that the SSB sets of the first example 500. For example, the SSB sets of the second example 550 may be configured to have a duration of 1 ms. In one aspect, the UE may be configured to select an SSB set that directly precedes the CDRX ON duration 552, and the UE may select the first SSB set 560 for the SSB warm-up procedure, which may result in a longer time of the waking up the UE and an increased power consumption from the increased waking up time.

In another aspect, the UE may be configured to select one of the first SSB set 560 or the second SSB set 562 based on a first time difference between the first SSB set 560 and the CDRX ON duration 552 and a second time difference between the second SSB set 562 and the CDRX ON duration 552. The UE may calculate the first time difference (Diff_before_DCRX) between the first SSB set 560 and the CDRX ON duration 552 as a timing difference between start of the first SSB set (SSBS_1_start) and the start of the CDRX ON duration (CDRX_start), e.g., Diff_before_DCRX=|CDRX_start−SSBS_1_start|. The UE may also calculate the second time difference (Diff_after_DCRX) between the second SSB set 562 and the CDRX ON duration 552 as a timing difference between an end of the second SSB set (SSBS_2_end) and an end of the CDRX ON duration (CDRX_end), e.g., Diff_after_DCRX=|SSBS_2_end−CDRX_end|. Here, the second time difference (Diff_after_DCRX) between the second SSB set 562 and the CDRX ON duration 552 is smaller than the first time difference (Diff_before_DCRX) between the first SSB set 560 and the CDRX ON duration 552, and therefore, the UE may select the second SSB set 562 for the SSB warm-up procedure, and the UE may have shorter wake-up time and reduced power consumption compared to selecting the first SSB set 560 for the SSB warm-up procedure.

FIGS. 6A, 6B, 6C, and 6D are examples 600, 620, 640, and 660 of wireless communication including SSB set selection in a CDRX in accordance with aspects presented herein. In some aspects, the UE may be configured to receive timing information for two adjacent SSB sets associated with the CDRX ON duration, the two adjacent SSB sets including a first SSB set having a first time difference relative to the CDRX ON duration and a second SSB set having a second time difference relative to the CDRX ON duration, and select one of the first SSB set or the second SSB set to wake up to measure the one of the first SSB set or the second SSB set having a smaller time difference relative to the CDRX ON duration.

Figure 6A:
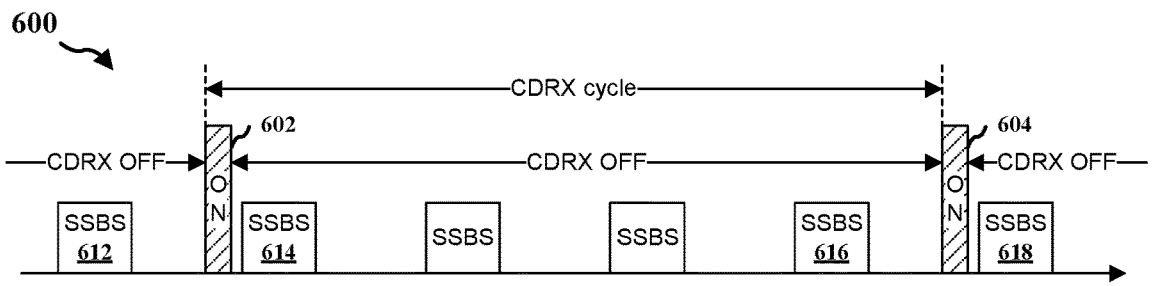
FIGS. 6A, 6B, 6C, and 6D are examples of wireless communication including SSB set selection in a CDRX in accordance with aspects presented herein.

FIG. 6A illustrates a first example 600 of wireless communication including SSB set selection in a CDRX. In one aspect, the UE may select one SSB set among the first SSB set 612 or the second SSB set 614 for SSB warm-up procedure associated with a first CDRX ON duration 602, based on a first time difference between the first SSB set 612 and the first CDRX ON duration 602 and a second time difference between the second SSB set 614 and the first CDRX ON duration 602. That is, the UE may be configured to select one of the first SSB set 612 or the second SSB set 614 based on a first time difference between the first SSB set 612 and the first CDRX ON duration 602 and a second time difference between the second SSB set 614 and the first CDRX ON duration 602. The UE may calculate the first time difference between the first SSB set 612 and the first CDRX ON duration 602 as a timing difference between start of the first SSB set and the start of the CDRX ON duration. The UE may also calculate the second time difference between the second SSB set 614 and the first CDRX ON duration 602 as a timing difference between an end of the second SSB set and an end of the CDRX ON duration. Here, the second time difference between the second SSB set 614 and the first CDRX ON duration 602 is smaller than the first time difference between the first SSB set 612 and the first CDRX ON duration 602, and therefore, the UE may select the second SSB set 614 for the SSB warm-up procedure, and the UE may have shorter wake-up time and reduced power consumption compared to selecting the first SSB set 612 for the SSB warm-up procedure.

In another aspect, the UE may select one SSB set among the third SSB set 616 or the fourth SSB set 618 for SSB warm-up procedure associated with a second CDRX ON duration 604, based on a first time difference between the third SSB set 616 and the second CDRX ON duration 604 and a second time difference between the fourth SSB set 618 and the second CDRX ON duration 604. That is, the UE may be configured to select one of the third SSB set 616 or the fourth SSB set 618 based on a first time difference between the third SSB set 616 and the second CDRX ON duration 604 and a second time difference between the fourth SSB set 618 and the second CDRX ON duration 604. The UE may calculate the first time difference between the third SSB set 616 and the second CDRX ON duration 604 as a timing difference between start of the first SSB set and the start of the CDRX ON duration. The UE may also calculate the second time difference between the fourth SSB set 618 and the second CDRX ON duration 604 as a timing difference between an end of the second SSB set and an end of the CDRX ON duration. Here, the second time difference between the fourth SSB set 618 and the second CDRX ON duration 604 is smaller than the first time difference between the third SSB set 616 and the second CDRX ON duration 604, and therefore, the UE may select the fourth SSB set 618 for the SSB warm-up procedure, and the UE may have shorter wake-up time and reduced power consumption compared to selecting the third SSB set 616 for the SSB warm-up procedure.

Figure 6B:
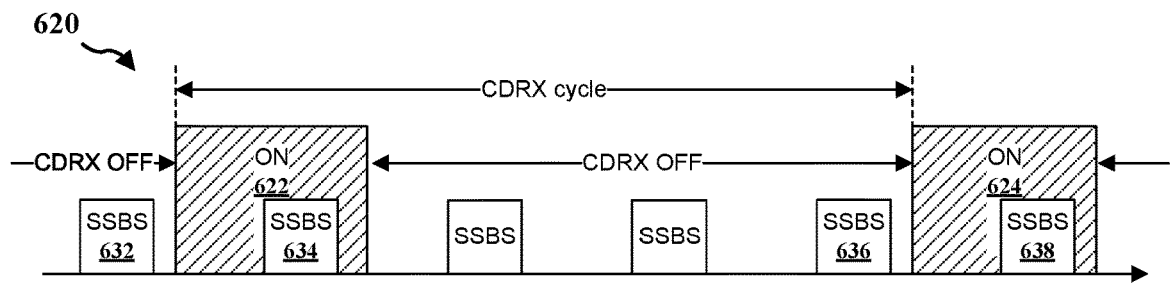

FIG. 6B illustrates a second example 620 of wireless communication including SSB set selection in a CDRX. In one aspect, the UE may select one SSB set among the first SSB set 632 or the second SSB set 634 for SSB warm-up procedure associated with a first CDRX ON duration 622, based on a first time difference between the first SSB set 632 and the first CDRX ON duration 622 and a second time difference between the second SSB set 634 and the first CDRX ON duration 622. That is, the UE may be configured to select one of the first SSB set 632 or the second SSB set 634 based on a first time difference between the first SSB set 632 and the first CDRX ON duration 622 and a second time difference between the second SSB set 634 and the first CDRX ON duration 622. The UE may calculate the first time difference between the first SSB set 632 and the first CDRX ON duration 622 as a timing difference between start of the first SSB set and the start of the CDRX ON duration. The UE may also calculate the second time difference between the second SSB set 634 and the first CDRX ON duration 622 as a timing difference between an end of the second SSB set and an end of the CDRX ON duration. Here, the second time difference between the second SSB set 634 and the first CDRX ON duration 622 may be smaller than the first time difference between the first SSB set 632 and the first CDRX ON duration 622, and therefore, the UE may select the second SSB set 634 for the SSB warm-up procedure, and the UE may have shorter wake-up time and reduced power consumption compared to selecting the first SSB set 632 for the SSB warm-up procedure.

In another aspect, the UE may select one SSB set among the third SSB set 636 or the fourth SSB set 638 for SSB warm-up procedure associated with a second CDRX ON duration 624, based on a first time difference between the third SSB set 636 and the second CDRX ON duration 624 and a second time difference between the fourth SSB set 638 and the second CDRX ON duration 624. That is, the UE may be configured to select one of the third SSB set 636 or the fourth SSB set 638 based on a first time difference between the third SSB set 636 and the second CDRX ON duration 624 and a second time difference between the fourth SSB set 638 and the second CDRX ON duration 624. The UE may calculate the first time difference between the third SSB set 636 and the second CDRX ON duration 624 as a timing difference between start of the first SSB set and the start of the CDRX ON duration. The UE may also calculate the second time difference between the fourth SSB set 638 and the second CDRX ON duration 624 as a timing difference between an end of the second SSB set and an end of the CDRX ON duration. Here, the second time difference between the fourth SSB set 638 and the second CDRX ON duration 624 may be smaller than the first time difference between the third SSB set 636 and the second CDRX ON duration 624, and therefore, the UE may select the fourth SSB set 638 for the SSB warm-up procedure, and the UE may have shorter wake-up time and reduced power consumption compared to selecting the third SSB set 636 for the SSB warm-up procedure.

Figure 6C:
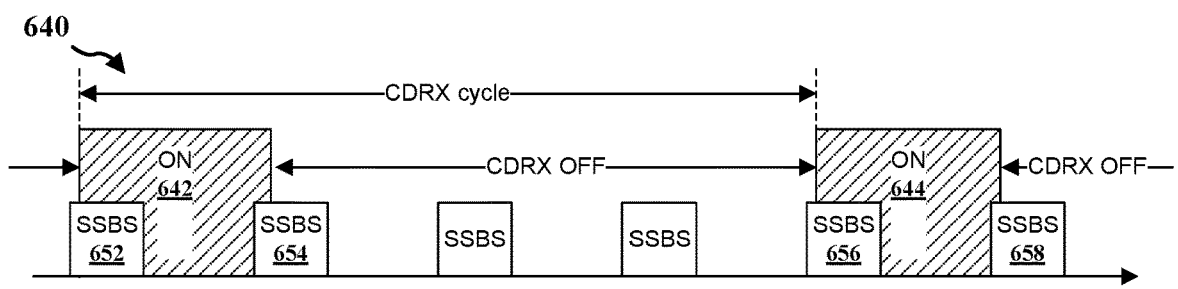

FIG. 6C illustrates a third example 640 of wireless communication including SSB set selection in a CDRX. In one aspect, the UE may select one SSB set among the first SSB set 652 or the second SSB set 654 for SSB warm-up procedure associated with a first CDRX ON duration 642, based on a first time difference between the first SSB set 652 and the first CDRX ON duration 642 and a second time difference between the second SSB set 654 and the first CDRX ON duration 642. That is, the UE may be configured to select one of the first SSB set 652 or the second SSB set 654 based on a first time difference between the first SSB set 652 and the first CDRX ON duration 642 and a second time difference between the second SSB set 654 and the first CDRX ON duration 642. The UE may calculate the first time difference between the first SSB set 652 and the first CDRX ON duration 642 as a timing difference between start of the first SSB set and the start of the CDRX ON duration. The UE may also calculate the second time difference between the second SSB set 654 and the first CDRX ON duration 642 as a timing difference between an end of the second SSB set and an end of the CDRX ON duration. Here, the first time difference between the first SSB set 652 and the first CDRX ON duration 642 is smaller than the second time difference between the second SSB set 654 and the first CDRX ON duration 642, and therefore, the UE may select the first SSB set 652 for the SSB warm-up procedure, and the UE may have shorter wake-up time and reduced power consumption compared to selecting the second SSB set 654 for the SSB warm-up procedure.

In another aspect, the UE may select one SSB set among the third SSB set 656 or the fourth SSB set 658 for SSB warm-up procedure associated with a second CDRX ON duration 644, based on a first time difference between the third SSB set 656 and the second CDRX ON duration 644 and a second time difference between the fourth SSB set 658 and the second CDRX ON duration 644. That is, the UE may be configured to select one of the third SSB set 656 or the fourth SSB set 658 based on a first time difference between the third SSB set 656 and the second CDRX ON duration 644 and a second time difference between the fourth SSB set 658 and the second CDRX ON duration 644. The UE may calculate the first time difference between the third SSB set 656 and the second CDRX ON duration 644 as a timing difference between start of the first SSB set and the start of the CDRX ON duration. The UE may also calculate the second time difference between the fourth SSB set 658 and the second CDRX ON duration 644 as a timing difference between an end of the second SSB set and an end of the CDRX ON duration. Here, the first time difference between the third SSB set 656 and the second CDRX ON duration 644 is smaller than the second time difference between the fourth SSB set 658 and the second CDRX ON duration 644, and therefore, the UE may select the third SSB set 656 for the SSB warm-up procedure, and the UE may have shorter wake-up time and reduced power consumption compared to selecting the fourth SSB set 658 for the SSB warm-up procedure.

Figure 6D:
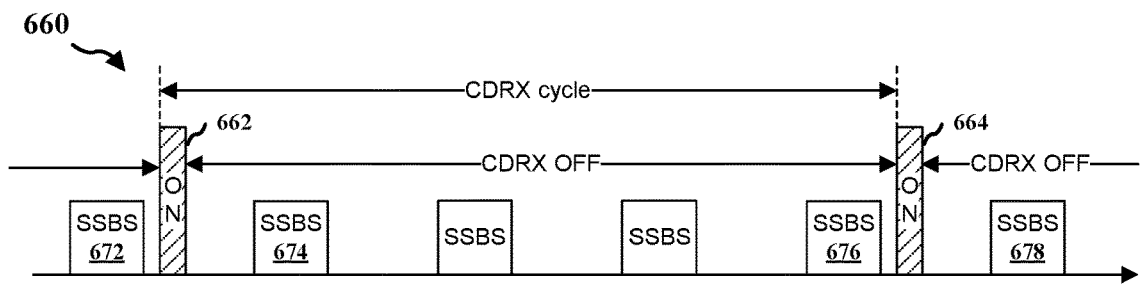

FIG. 6D illustrates a fourth example 660 of wireless communication including SSB set selection in a CDRX. In one aspect, the UE may select one SSB set among the first SSB set 672 or the second SSB set 674 for SSB warm-up procedure associated with a first CDRX ON duration 662, based on a first time difference between the first SSB set 672 and the first CDRX ON duration 662 and a second time difference between the second SSB set 674 and the first CDRX ON duration 662. That is, the UE may be configured to select one of the first SSB set 672 or the second SSB set 674 based on a first time difference between the first SSB set 672 and the first CDRX ON duration 662 and a second time difference between the second SSB set 674 and the first CDRX ON duration 662. The UE may calculate the first time difference between the first SSB set 672 and the first CDRX ON duration 662 as a timing difference between start of the first SSB set and the start of the CDRX ON duration. The UE may also calculate the second time difference between the second SSB set 674 and the first CDRX ON duration 662 as a timing difference between an end of the second SSB set and an end of the CDRX ON duration. Here, the first time difference between the first SSB set 672 and the first CDRX ON duration 662 is smaller than the second time difference between the second SSB set 674 and the first CDRX ON duration 662, and therefore, the UE may select the first SSB set 672 for the SSB warm-up procedure, and the UE may have shorter wake-up time and reduced power consumption compared to selecting the second SSB set 674 for the SSB warm-up procedure.

In another aspect, the UE may select one SSB set among the third SSB set 676 or the fourth SSB set 678 for SSB warm-up procedure for a second CDRX ON duration 664, based on a first time difference between the third SSB set 676 and the second CDRX ON duration 664 and a second time difference between the fourth SSB set 678 and the second CDRX ON duration 664. That is, the UE may be configured to select one of the third SSB set 676 or the fourth SSB set 678 based on a first time difference between the third SSB set 676 and the second CDRX ON duration 664 and a second time difference between the fourth SSB set 678 and the second CDRX ON duration 664. The UE may calculate the first time difference between the third SSB set 676 and the second CDRX ON duration 664 as a timing difference between start of the first SSB set and the start of the CDRX ON duration. The UE may also calculate the second time difference between the fourth SSB set 678 and the second CDRX ON duration 664 as a timing difference between an end of the second SSB set and an end of the CDRX ON duration. Here, the first time difference between the third SSB set 676 and the second CDRX ON duration 664 is smaller than the second time difference between the fourth SSB set 678 and the second CDRX ON duration 664, and therefore, the UE may select the third SSB set 676 for the SSB warm-up procedure, and the UE may have shorter wake-up time and reduced power consumption compared to selecting the fourth SSB set 678 for the SSB warm-up procedure.

Based on the one or more embodiments, the UE may be configured to select the SSB set for SSB warm-up procedure for CDRX to improve or reduce the overall power consumption. Significantly improve power consumption. Particularly, the UE may perform an optimized or improved SSB set selection for performing the SSB warm-up procedure that may be configured with the smallest or smaller potential wake-up duration, for the CDRX mobility and loop maintenance purpose. The algorithm of selecting the optimized or improved SSB set may be based on the CDRX location and the SSB set or an SSB based measurement timing configuration (SMTC) periodicity, which can be "on top of CDRX wakeup SFN" or after "CDRX wakeup" as well.

The UE configured with the SSB warm-up procedure of the one or more embodiments may show distinct energy or power consumption pattern. For example, the UE configured with the SSB warm-up procedure of the one or more embodiments may show a battery waveform that is bumped up or increases at the SSBS which is closest to CDRX ON period or duration.

Figure 7:
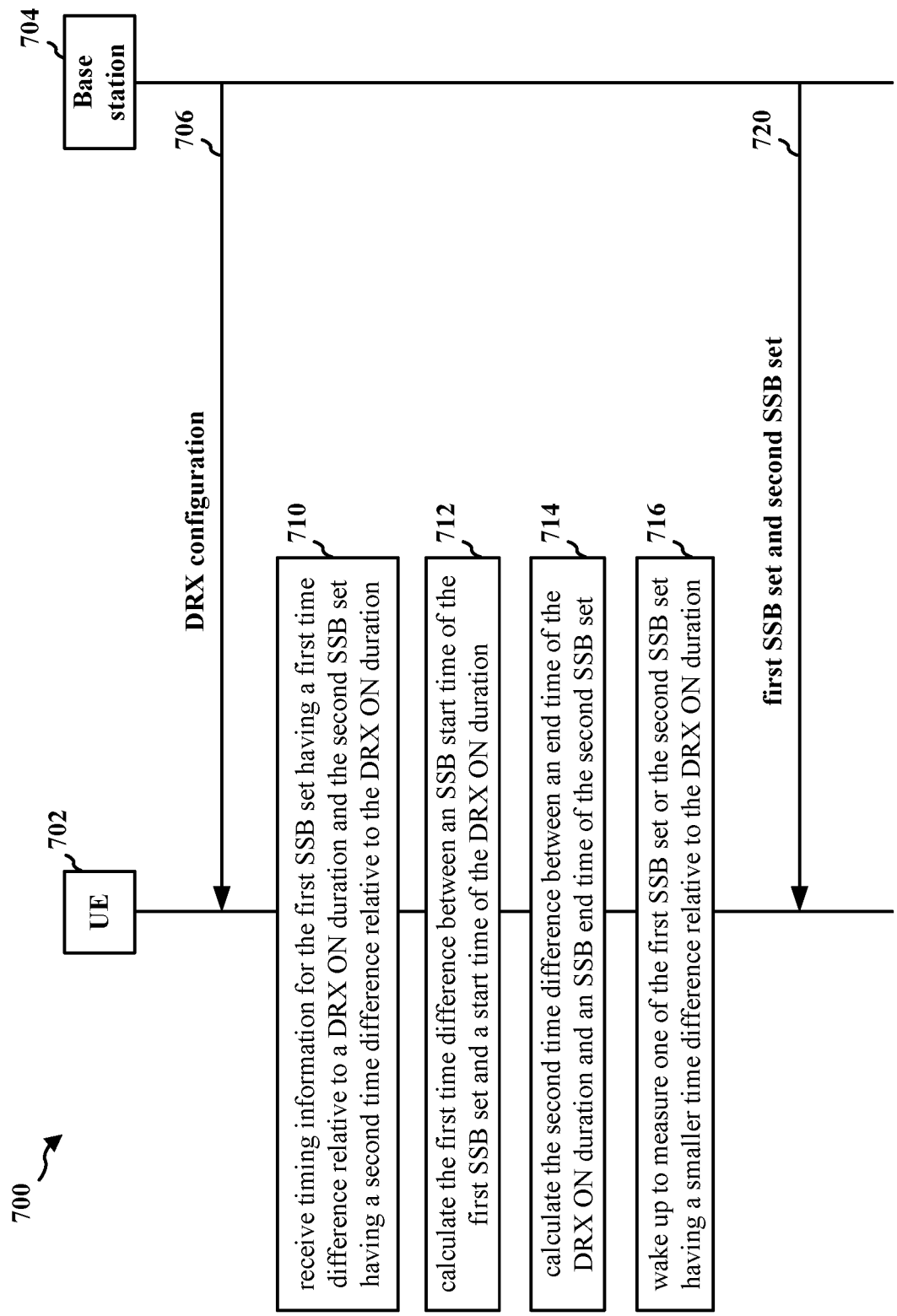
FIG. 7 is a call-flow diagram of a method of wireless communication in accordance with aspects presented herein.

FIG. 7 is a call-flow diagram 700 of a method of wireless communication in accordance with aspects presented herein. The call-flow diagram 700 may include a UE 702 and a base station 704. The base station 704 may configure the UE 702 with the DRX, e.g., CDRX, and the UE 702 may select an SSB set to perform an SSB warm-up to wake up, search, and measure the SSB set to improve the performance of the UE 702 during the DRX ON duration. The UE 702 may select the SSB set based on a time difference of the SSB set relative to the CDRX ON duration.

At 706, the base station 704 may transmit, to the UE 702, a DRX configuration including at least one parameter of the DRX ON duration, and the UE 702 may receive, from the base station 704, the DRX configuration including at least one parameter of the DRX ON duration. Here, the at least one parameter may include at least one of a start time, a length, or an end time of the DRX ON duration, or an SSB start time, an SSB length, or an SSB end time of a plurality of SSB sets including the first SSB set and the second SSB set.

At 710, the UE 702 may receive timing information for a first SSB set having a first time difference relative to a DRX ON duration for the UE 702 and for a second SSB set having a second time difference relative to the DRX ON duration for the UE 702. The first SSB set may be configured to start before the DRX ON duration and the second SSB set may be configured to start after the DRX ON duration. Accordingly, the UE 702 may be configured with the DRX ON duration that the UE 702 is awake or turned on to receive and decode signal from the base station 704, and a DRX OFF duration that the UE 702 is configured to sleep or be turned off to save power.

At 712, the UE 702 may calculate the first time difference between an SSB start time of the first SSB set and a start time of the DRX ON duration. The first time difference (Diff_before_DCRX) between the first SSB set and the CDRX ON duration may be calculated as a timing difference between a start of the first SSB set (SSBS_1_start) and the start of the CDRX ON duration (CDRX_start), e.g., Diff_before_DCRX=|CDRX_start−SSBS_1_start|. As the first SSB set may be configured to start before the start of the CDRX ON duration, the CDRX_start−SSBS_1_start may have a positive value.

At 714, the UE 702 may calculate the second time difference between an end time of the DRX ON duration and an SSB end time of the second SSB set. The second time difference (Diff_after_DCRX) between the second SSB set and the CDRX ON duration may be calculated as a timing difference between an end of the second SSB set (SSBS_2_end) and an end of the CDRX ON duration (CDRX_end), e.g., Diff_after_DCRX=|SSBS_2_end−CDRX_end|. As the second SSB set may be configured to start after the start of the CDRX ON duration and the end of the second SSB may come before or after the end of the CDRX ON duration, the SSBS_2_end−CDRX_end may have either a positive value or a negative value. The UE may consider an absolute value, e.g., the positive value, of the difference between the SSBS_2_end and the CDRX_end when determining a smaller time difference between the SSBSs and the CDRX ON duration.

At 716, the UE 702 may wake up to measure one of the first SSB set or the second SSB set having a smaller time difference relative to the DRX ON duration. That is, the UE 702 may select one of the first SSB set or the second SSB set having a smaller time difference relative to the DRX ON duration and wake up, search, and measure the selected SSB set to improve the performance of the UE 702 during the CDRX ON duration. Particularly, the UE 702 may be configured to wake up to measure the one of the first SSB set or the second SSB set having a smaller wakeup duration in combination with the DRX ON duration. That is, the UE 702 may wake up to measure one of the first SSB set or the second SSB set having a smaller time difference based on the first time difference calculated at 712 and the second time difference calculated at 714.

At 720, the base station 704 may transmit, to the UE 702, the first SSB set and the second SSB set. The UE 702 may receive, from the base station 704, the first SSB set or the second SSB set. Here, the UE 702 may receive one of the first SSB set or the second SSB set based on the selected one of the first SSB set or the second SSB having a smaller time difference relative to the DRX ON duration at 716, and wake up, search, and measure the selected SSB set to improve the performance of the UE during the CDRX ON duration.

Figure 8:
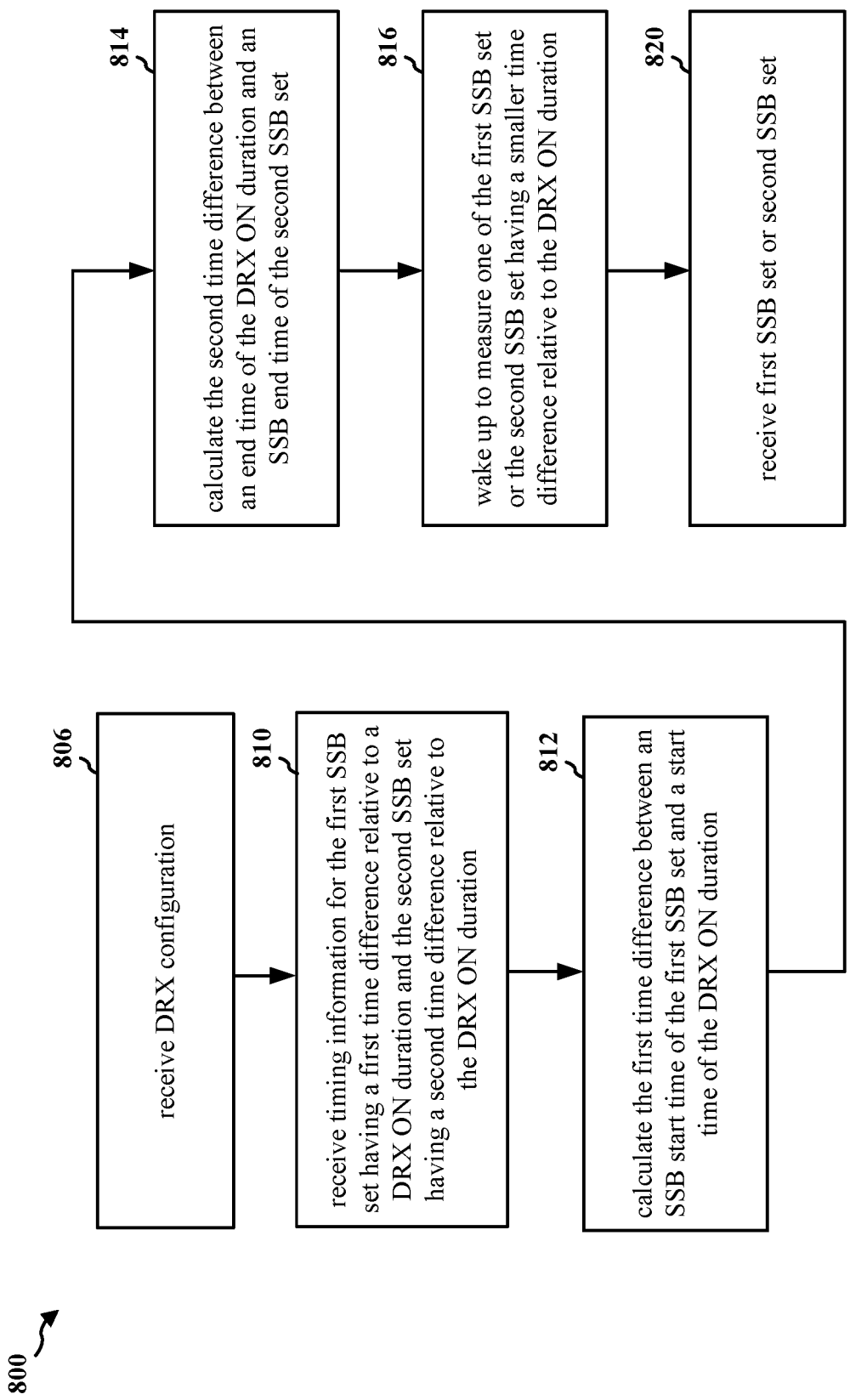
FIG. 8 is a flowchart of a method of wireless communication in accordance with aspects presented herein.

FIG. 8 is a flowchart 800 of a method of wireless communication in accordance with aspects presented herein. The method may be performed by a UE (e.g., the UE 104; the apparatus 1102). The UE may be configured with the DRX, e.g., CDRX, and the UE may select an SSB set to perform an SSB warm-up to wake up, search, and measure the SSB set to improve the performance of the UE during the DRX ON duration. The UE may select the SSB set based on a time difference of the SSB set relative to the CDRX ON duration.

At 806, the UE may receive, from the base station, the DRX configuration including at least one parameter of the DRX ON duration. Here, the at least one parameter may include at least one of a start time, a length, or an end time of the DRX ON duration, or an SSB start time, an SSB length, or an SSB end time of a plurality of SSB sets including the first SSB set and the second SSB set. For example, at 706, the UE 702 may receive, from the base station 704, the DRX configuration including at least one parameter of the DRX ON duration. Furthermore, 806 may be performed by a DRX component 1140.

At 810, the UE may receive timing information for a first SSB set having a first time difference relative to a DRX ON duration for the UE and for a second SSB set having a second time difference relative to the DRX ON duration for the UE. The first SSB set may be configured to start before the DRX ON duration and the second SSB set may be configured to start after the DRX ON duration. Accordingly, the UE may be configured with the DRX ON duration that the UE is awake or turned on to receive and decode signal from the base station, and a DRX OFF duration that the UE is configured to sleep or be turned off to save power. For example, at 710, the UE 702 may receive timing information for a first SSB set having a first time difference relative to a DRX ON duration for the UE 702 and for a second SSB set having a second time difference relative to the DRX ON duration for the UE 702. Furthermore, 810 may be performed by the SSB warm-up component 1142.

At 812, the UE may calculate the first time difference between an SSB start time of the first SSB set and a start time of the DRX ON duration. The first time difference (Diff_before_DCRX) between the first SSB set and the CDRX ON duration may be calculated as a timing difference between a start of the first SSB set (SSBS_1_start) and the start of the CDRX ON duration (CDRX_start), e.g., Diff_before_DCRX=|CDRX_start−SSBS_1_start|. As the first SSB set may be configured to start before the start of the CDRX ON duration, the CDRX_start−SSBS_1_start may have a positive value. For example, at 712, the UE 702 may calculate the first time difference between an SSB start time of the first SSB set and a start time of the DRX ON duration. Furthermore, 812 may be performed by the SSB warm-up component 1142.

At 814, the UE may calculate the second time difference between an end time of the DRX ON duration and an SSB end time of the second SSB set. The second time difference (Diff_after_DCRX) between the second SSB set and the CDRX ON duration may be calculated as a timing difference between an end of the second SSB set (SSBS_2_end) and an end of the CDRX ON duration (CDRX_end), e.g., Diff_after_DCRX=|SSBS_2_end−CDRX_end|. As the second SSB set may be configured to start after the start of the CDRX ON duration and the end of the second SSB may come before or after the end of the CDRX ON duration, the SSBS_2_end−CDRX_end may have either a positive value or a negative value. The UE may consider the absolute value, e.g., the positive value, of the time difference when determining a smaller time difference between SSBSs and the CDRX ON duration, e.g., at 816. For example, at 714, the UE 702 may calculate the second time difference between an end time of the DRX ON duration and an SSB end time of the second SSB set. Furthermore, 814 may be performed by the SSB warm-up component 1142.

At 816, the UE may wake up to measure one of the first SSB set or the second SSB set having a smaller time difference relative to the DRX ON duration. That is, the UE may select one of the first SSB set or the second SSB set having a smaller time difference relative to the DRX ON duration and wake up, search, and measure the selected SSB set to improve the performance of the UE during the CDRX ON duration. Particularly, the UE may be configured to wake up to measure the one of the first SSB set or the second SSB set having a smaller wakeup duration in combination with the DRX ON duration. That is, the UE may wake up to measure one of the first SSB set or the second SSB set having a smaller time difference based on the first time difference calculated at 812 and the second time difference calculated at 814. For example, at 716, the UE 702 may wake up to measure one of the first SSB set or the second SSB set having a smaller time difference relative to the DRX ON duration. Furthermore, 816 may be performed by the SSB warm-up component 1142.

At 820, the UE may receive, from the base station, the first SSB set or the second SSB set. Here, the UE may receive one of the first SSB set or the second SSB set based on the selected one of the first SSB set or the second SSB having a smaller time difference relative to the DRX ON duration and wake up, search, and measure the selected SSB set to improve the performance of the UE during the CDRX ON duration. For example, at 708, the UE 702 may receive, from the base station 704, the first SSB set or the second SSB set. Furthermore, 820 may be performed by an SSB warm-up component 1142.

Figure 9:
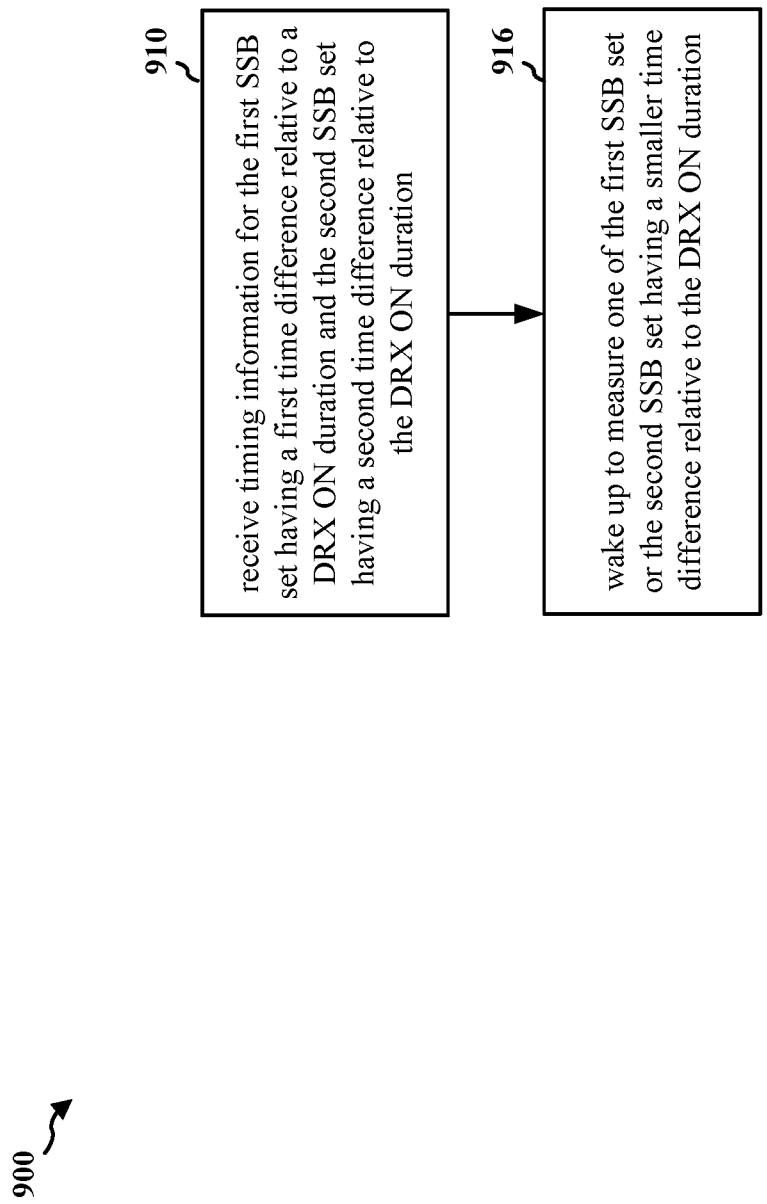
FIG. 9 is a flowchart of a method of wireless communication in accordance with aspects presented herein.

FIG. 9 is a flowchart 900 of a method of wireless communication in accordance with aspects presented herein. The method may be performed by a UE (e.g., the UE 104; the apparatus 1102). The UE may be configured with the DRX, e.g., CDRX, and the UE may select an SSB set to perform an SSB warm-up to wake up, search, and measure the SSB set to improve the performance of the UE during the DRX ON duration. The UE may select the SSB set based on a time difference of the SSB set relative to the CDRX ON duration.

At 910, the UE may receive timing information for a first SSB set having a first time difference relative to a DRX ON duration for the UE and for a second SSB set having a second time difference relative to the DRX ON duration for the UE. The first SSB set may be configured to start before the DRX ON duration and the second SSB set may be configured to start after the DRX ON duration. Accordingly, the UE may be configured with the DRX ON duration that the UE is awake or turned on to receive and decode signal from the base station, and a DRX OFF duration that the UE is configured to sleep or be turned off to save power. For example, at 710, the UE 702 may receive timing information for a first SSB set having a first time difference relative to a DRX ON duration for the UE 702 and for a second SSB set having a second time difference relative to the DRX ON duration for the UE 702. Furthermore, 910 may be performed by the SSB warm-up component 1142.

At 916, the UE may wake up to measure one of the first SSB set or the second SSB set having a smaller time difference relative to the DRX ON duration. That is, the UE may select one of the first SSB set or the second SSB set having a smaller time difference relative to the DRX ON duration and wake up, search, and measure the selected SSB set to improve the performance of the UE during the CDRX ON duration. Particularly, the UE may be configured to wake up to measure the one of the first SSB set or the second SSB set having a smaller wakeup duration in combination with the DRX ON duration. That is, the UE may wake up to measure one of the first SSB set or the second SSB set having a smaller time difference based on the first time difference calculated and the second time difference calculated. For example, at 716, the UE 702 may wake up to measure one of the first SSB set or the second SSB set having a smaller time difference relative to the DRX ON duration. Furthermore, 916 may be performed by the SSB warm-up component 1142.

Figure 10:
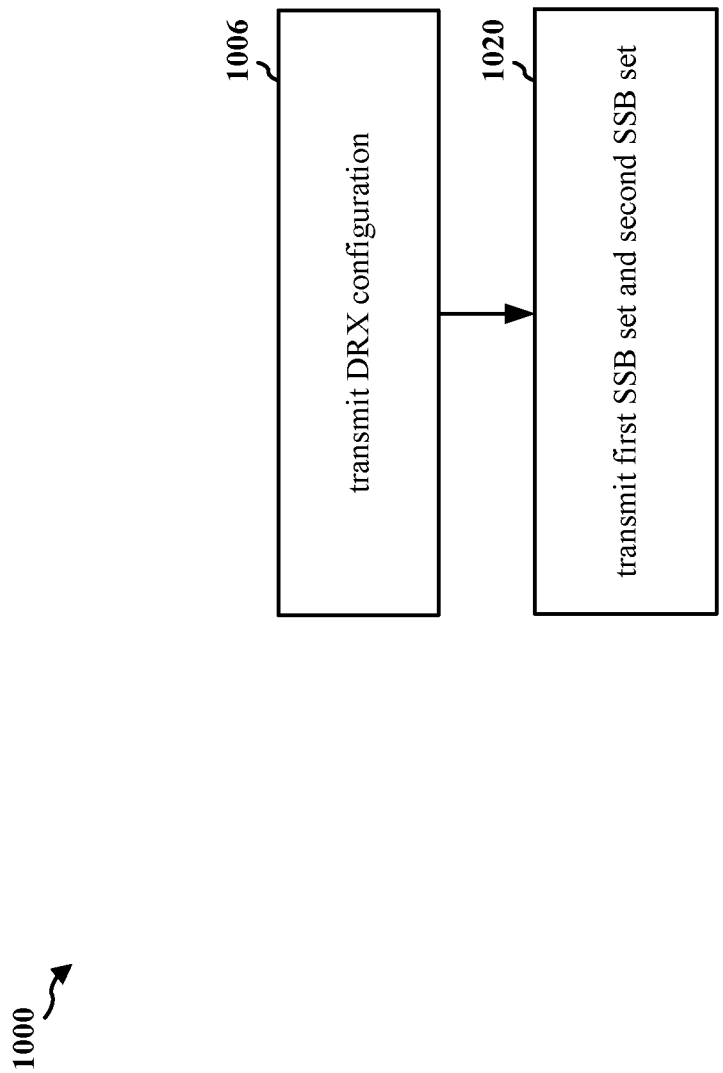
FIG. 10 is a flowchart of a method of wireless communication in accordance with aspects presented herein.

FIG. 10 is a flowchart 1000 of a method of wireless communication in accordance with aspects presented herein. The method may be performed by a base station (e.g., the base station 102/180; the apparatus 1202). The base station may configure a UE with a DRX, e.g., CDRX, and transmit a first SSB set and a second SSB set to the UE.

At 1006, the base station may transmit, to the UE, a DRX configuration including at least one parameter of the DRX ON duration. Here, the at least one parameter may include at least one of a start time, a length, or an end time of the DRX ON duration, or an SSB start time, an SSB length, or an SSB end time of a plurality of SSB sets including the first SSB set and the second SSB set. The base station may configure the UE with the DRX ON duration that the UE is awake or turned on to receive and decode signal from the base station, and a DRX OFF duration that the UE is configured to sleep or be turned off to save power. For example, at 706, the base station 704 may transmit, to the UE 702, a DRX configuration including at least one parameter of the DRX ON duration. Furthermore, 1006 may be performed by a DRX component 1240.

At 1020, the base station may transmit, to the UE, a first SSB set and a second SSB set. The first SSB set may be configured to start before the DRX ON duration and the second SSB set may be configured to start after the DRX ON duration. For example, at 708, the base station 704 may transmit, to the UE 702, a first SSB set and a second SSB set. Furthermore, 1020 may be performed by an SSB component 1242.

Figure 11:
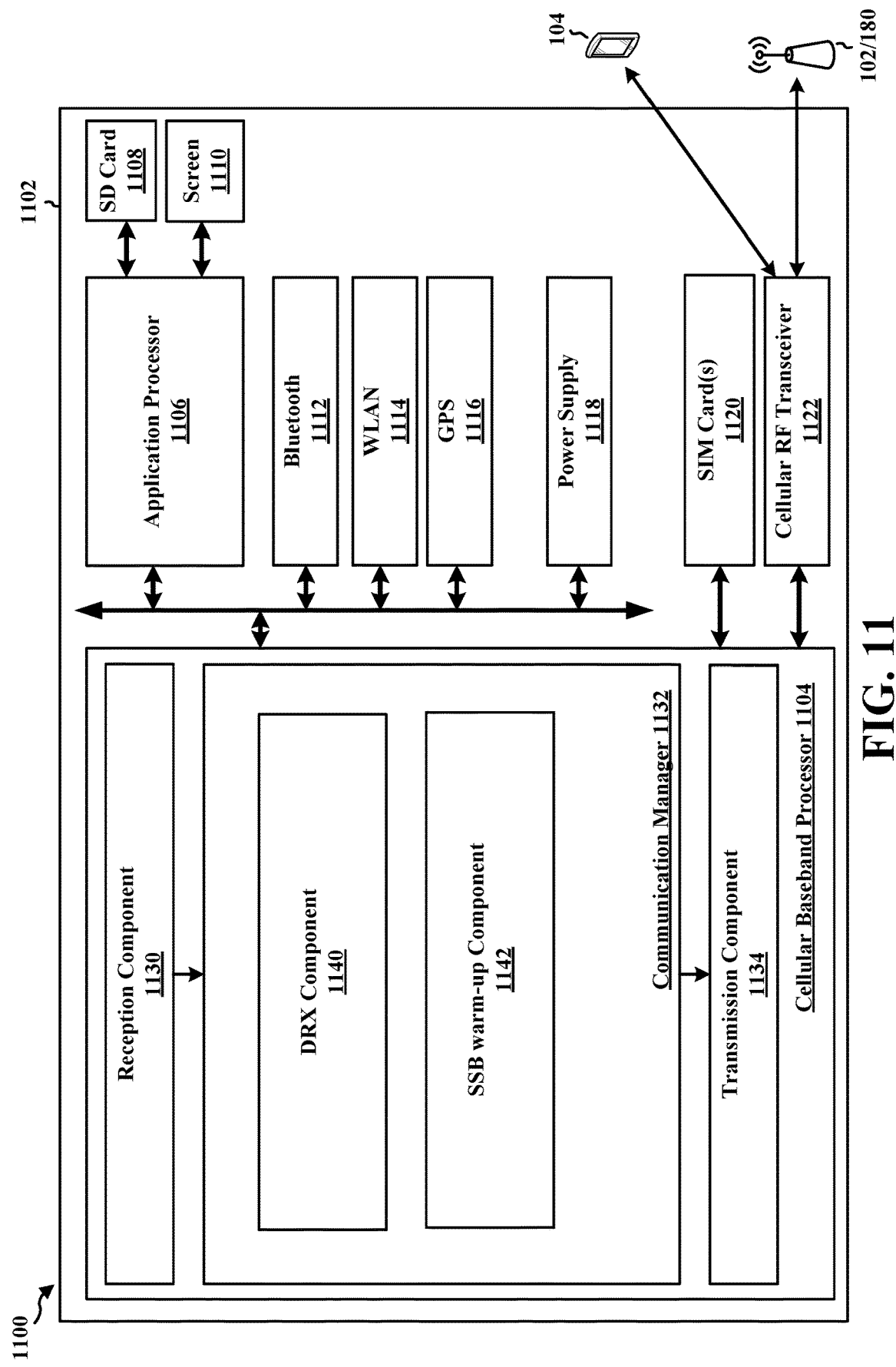
FIG. 11 is a diagram illustrating an example of a hardware implementation for an example apparatus in accordance with aspects presented herein.

FIG. 11 is a diagram 1100 illustrating an example of a hardware implementation for an apparatus 1102 in accordance with aspects presented herein. The apparatus 1102 may be a UE, a component of a UE, or may implement UE functionality. In some aspects, the apparatus 1102 may include a cellular baseband processor 1104 (also referred to as a modem) coupled to a cellular RF transceiver 1122. In some aspects, the apparatus 1102 may further include one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, or a power supply 1118. The cellular baseband processor 1104 communicates through the cellular RF transceiver 1122 with the UE 104 and/or BS 102/180. The cellular baseband processor 1104 may include a computer-readable medium/memory. The computer-readable medium/memory may be non-transitory. The cellular baseband processor 1104 is responsible for general processing, including the execution of software stored on the computer-readable medium/memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the UE 350 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire UE (e.g., see 350 of FIG. 3) and include the additional modules of the apparatus 1102.

The communication manager 1132 includes a DRX component 1140 that is configured to receive the DRX configuration including at least one parameter of the DRX ON duration, e.g., as described in connection with 806. The communication manager 1132 further includes an SSB warm-up component 1142 that is configured to receive timing information for a first SSB set having a first time difference relative to a DRX ON duration for the UE and for a second SSB set having a second time difference relative to the DRX ON duration for the UE, calculate the first time difference between an SSB start time of the first SSB set and a start time of the DRX ON duration, calculate the second time difference between an end time of the DRX ON duration and an SSB end time of the second SSB set, wake up to measure one of the first SSB set or the second SSB set having a smaller time difference relative to the DRX ON duration, and receive the first SSB set or the second SSB set, e.g., as described in connection with 810, 812, 814, 816, 820, 910, and 916.

The apparatus may include additional components that perform each of the blocks of the algorithm in the flowcharts of FIGS. 7, 8, and 9. As such, each block in the flowcharts of FIGS. 7, 8, and 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1102 may include a variety of components configured for various functions. In one configuration, the apparatus 1102, and in particular the cellular baseband processor 1104, includes means for receiving timing information for a first SSB set having a first time difference relative to a DRX ON duration for the UE and for a second SSB set having a second time difference relative to the DRX ON duration for the UE, and means for waking up to measure one of the first SSB set or the second SSB set having a smaller time difference relative to the DRX ON duration. The apparatus 1102 includes means for calculating the first time difference between an SSB start time of the first SSB set and a start time of the DRX ON duration, and means for calculating the second time difference between an end time of the DRX ON duration and an SSB end time of the second SSB set. The apparatus 1102 includes means for receiving, from the base station, a DRX configuration including at least one parameter of the DRX ON duration. The means may be one or more of the components of the apparatus 1102 configured to perform the functions recited by the means. As described supra, the apparatus 1102 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 12:
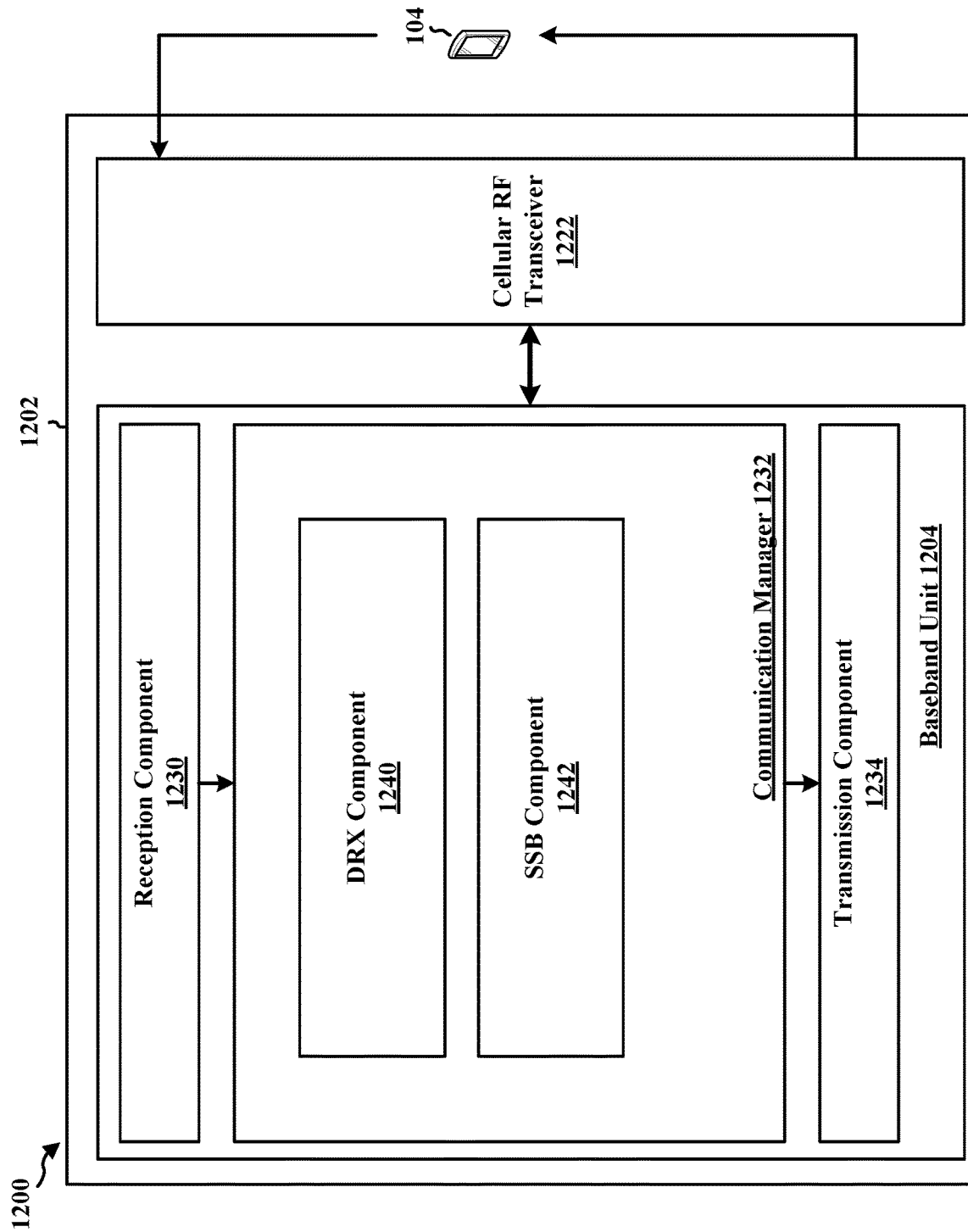
FIG. 12 is a diagram illustrating an example of a hardware implementation for an example apparatus in accordance with aspects presented herein.

FIG. 12 is a diagram 1200 illustrating an example of a hardware implementation for an apparatus 1202 in accordance with aspects presented herein. The apparatus 1202 may be a base station, a component of a base station, or may implement base station functionality. In some aspects, the apparatus 1102 may include a baseband unit 1204. The baseband unit 1204 may communicate through a cellular RF transceiver 1222 with the UE 104. The baseband unit 1204 may include a computer-readable medium/memory. The baseband unit 1204 is responsible for general processing, including the execution of software stored on the computer-readable medium/memory. The software, when executed by the baseband unit 1204, causes the baseband unit 1204 to perform the various functions described supra. The computer-readable medium/memory may also be used for storing data that is manipulated by the baseband unit 1204 when executing software. The baseband unit 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband unit 1204. The baseband unit 1204 may be a component of the base station 310 and may include the memory 376 and/or at least one of the TX processor 316, the RX processor 370, and the controller/processor 375.

The communication manager 1232 includes a DRX component 1240 that is configured to transmit a DRX configuration including at least one parameter of the DRX ON duration, e.g., as described in connection with 1006. The communication manager 1232 further includes an SSB component 1242 that is configured to transmit a first SSB set and a second SSB set, e.g., as described in connection with 1020.

The apparatus may include additional components that perform each of the blocks of the algorithm in the flowcharts of FIGS. 7 and 10. As such, each block in the flowcharts of FIGS. 7 and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1202 may include a variety of components configured for various functions. In one configuration, the apparatus 1202, and in particular the baseband unit 1204, includes means for transmitting a DRX configuration including at least one parameter of the DRX ON duration and transmitting a first SSB set and a second SSB set. The means may be one or more of the components of the apparatus 1202 configured to perform the functions recited by the means. As described supra, the apparatus 1202 may include the TX Processor 316, the RX Processor 370, and the controller/processor 375. As such, in one configuration, the means may be the TX Processor 316, the RX Processor 370, and the controller/processor 375 configured to perform the functions recited by the means.

A base station may configure a UE with a DRX, e.g., CDRX, and the UE may select a SSB set to perform an SSB warm-up to wake up, search, and measure the SSB set to improve the performance of the UE during a DRX ON duration. The UE may select the SSB set based on a time difference of the SSB set relative to the DRX ON duration. The UE may be configured to wake up to measure one of a first SSB set or a second SSB set having a smaller time difference relative to the DRX ON duration.

The first SSB set may be configured to start before the DRX ON duration and the second SSB set may be configured to start after the DRX ON duration, and the UE may calculate the first time difference between an SSB start time of the first SSB set and a start time of the DRX ON duration and calculate the second time difference between an end time of the DRX ON duration and an SSB end time of the second SSB set.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is method of wireless communication including receiving timing information for a first SSB set having a first time difference relative to a DRX ON duration for the UE and for a second SSB set having a second time difference relative to the DRX ON duration for the UE, and waking up to measure one of the first SSB set or the second SSB set having a smaller time difference relative to the DRX ON duration.

In Aspect 2 is the method of aspect 1, includes waking up to measure the one of the first SSB set or the second SSB set having a smaller wakeup duration in combination with the DRX ON duration.

In Aspect 3 is the method of any of aspects 1 and 2 further includes that the first SSB set is configured to start before the DRX ON duration and the second SSB set is configured to start after the DRX ON duration.

In Aspect 4 is the method of aspect 3 further includes calculating the first time difference between an SSB start time of the first SSB set and a start time of the DRX ON duration, and calculate the second time difference between an end time of the DRX ON duration and an SSB end time of the second SSB set.

In Aspect 5 is the method of any of aspects 1 to 4 further includes receiving, from the base station, a DRX configuration including at least one parameter of the DRX ON duration.

In Aspect 6 is the method of aspect 5 further includes that the at least one parameter includes at least one of a start time, a length, or an end time of the DRX ON duration, or an SSB start time, an SSB length, or an SSB end time of a plurality of SSB sets including the first SSB set and the second SSB set.

Aspect 7 an apparatus for wireless communication comprising memory and at least one processor coupled to the memory and configured to implement the method of any of aspects 1 to 6.

In aspect 8, the apparatus of aspect 7 further includes at least one antenna coupled to the at least one processor.

In aspect 9, the apparatus of aspect 7 or aspect 8 further includes at least one transceiver coupled to the at least one processor.

Aspect 10 is an apparatus for wireless communication including means for implementing any of aspects 1 to 6.

In aspect 11, the apparatus of aspect 10 further includes at least one antenna.

In aspect 12, the apparatus of aspect 10 or aspect 11 further includes at least one transceiver.

Aspect 13 is a non-transitory computer-readable medium storing computer executable code, where the code when executed by a processor causes the processor to implement any of aspects 1 to 6.

What is claimed is:

1. An apparatus for wireless communication at a user equipment (UE), comprising:
   memory; and
   at least one processor coupled to the memory and configured to cause the UE to:
   receive, from a base station, a discontinuous reception (DRX) configuration having a DRX ON duration for the UE;
   determine a smallest wakeup duration between a first synchronization signal block (SSB) set and a second SSB set in combination with the DRX ON duration, wherein at least one of the first SSB set and the second SSB set extends outside of the DRX ON duration;
   select, from multiple SSB sets including the first SSB set and the second SSB set, an SSB set for an SSB warm up procedure in connection with the DRX ON duration, wherein the at least one processor is configured to select the SSB set from the multiple SSB sets having a smallest time difference relative to the DRX ON duration and providing the smallest wakeup duration in the combination with the DRX ON duration; and
   wake up to measure the selected SSB set.

2. The apparatus of claim 1, wherein reception of the first SSB set is configured to start before the DRX ON duration and reception of the second SSB set is configured to start after the DRX ON duration.

3. The apparatus of claim 2, wherein to select the SSB set for the SSB warm up procedure in connection with the DRX ON duration, the at least one processor is further configured to:
   calculate a first time difference between an SSB start time of the first SSB set and a start time of the DRX ON duration;
   calculate a second time difference between an end time of the DRX ON duration and an SSB end time of the second SSB set and
   compare the first time difference to the second time difference to select the SSB set for the SSB warm up procedure.

4. The apparatus of claim 1, wherein the DRX configuration includes at least one parameter of the DRX ON duration.

5. The apparatus of claim 4, wherein the at least one parameter includes at least one of a start time, a length, or an end time of the DRX ON duration, or an SSB start time, an SSB length, or an SSB end time of a plurality of SSB sets including the first SSB set and the second SSB set.

6. The apparatus of claim 1, further comprising a transceiver coupled to the at least one processor.

7. The apparatus of claim 1, further comprising at least one antenna coupled to the at least one processor.

8. A method of wireless communication at a user equipment (UE), comprising:
   receiving, from a base station, a discontinuous reception (DRX) configuration having a DRX ON duration for the UE;
   determining a smallest wakeup duration between a first synchronization signal block (SSB) set and a second SSB set in combination with the DRX ON duration, wherein at least one of the first SSB set and the second SSB set extends outside of the DRX ON duration;
   selecting, from multiple SSB sets including the first SSB set and the second SSB set, an SSB set for an SSB warm up procedure in connection with the DRX ON duration, wherein the UE selects the or a second SSB set from the multiple SSB sets having a smallest smaller time difference relative to the DRX ON duration and providing the smallest wakeup duration in combination with the DRX ON duration; and
   waking up to measure the selected SSB set.

9. The method of claim 8, wherein reception of the first SSB set is configured to start before the DRX ON duration and reception of the second SSB set is configured to start after the DRX ON duration.

10. The method of claim 9, wherein selecting the SSB set for the SSB warm up procedure in connection with the DRX ON duration further comprises:
    calculating a first time difference between an SSB start time of the first SSB set and a start time of the DRX ON duration;
    calculating a second time difference between an end time of the DRX ON duration and an SSB end time of the second SSB set and
    comparing the first time difference to the second time difference to select the SSB set for the SSB warm up procedure.

11. The method of claim 8, wherein the DRX configuration includes at least one parameter of the DRX ON duration.

12. The method of claim 11, wherein the at least one parameter includes at least one of a start time, a length, or an end time of the DRX ON duration, or an SSB start time, an SSB length, or an SSB end time of a plurality of SSB sets including the first SSB set and the second SSB set.

13. An apparatus for wireless communication at a user equipment (UE), comprising:
    means for receiving, from a base station, a discontinuous reception (DRX) configuration having a DRX ON duration for the UE;
    means for determining a smallest wakeup duration between a first synchronization signal block (SSB) set and a second SSB set in combination with the DRX ON duration, wherein at least one of the first SSB set and the second SSB set extends outside of the DRX ON duration;
    select, from multiple SSB sets including the first SSB set and the second SSB set, an SSB set for an SSB warm up procedure in connection with the DRX ON duration, wherein the means for selecting is configured to select the SSB set from the multiple SSB sets having a smallest time difference relative to the DRX ON duration and providing the smallest wakeup duration in the combination with the DRX ON duration; and
    means for waking up to measure the selected SSB set.

14. The apparatus of claim 13, wherein reception of the first SSB set is configured to start before the DRX ON duration and reception of the second SSB set is configured to start after the DRX ON duration.

15. The apparatus of claim 14, further comprising:
    means for calculating a first time difference between an SSB start time of the first SSB set and a start time of the DRX ON duration;
    means for calculating a second time difference between an end time of the DRX ON duration and an SSB end time of the second SSB set and
    means for comparing the first time difference to the second time difference to select the SSB set for the SSB warm up procedure.

16. The apparatus of claim 13, wherein the DRX configuration includes at least one parameter of the DRX ON duration.

17. The apparatus of claim 16, wherein the at least one parameter includes at least one of a start time, a length, or an end time of the DRX ON duration, or an SSB start time, an SSB length, or an SSB end time of a plurality of SSB sets including the first SSB set and the second SSB set.

18. The apparatus of claim 13, further comprising a transceiver.

19. A non-transitory computer-readable medium storing computer executable code at a user equipment (UE), the code when executed by at least one processor causes the UE to:
    receive, from a base station, a discontinuous reception (DRX) configuration having a DRX ON duration for the UE;
    determine a smallest wakeup duration between a first synchronization signal block (SSB) set and a second SSB set in combination with the DRX ON duration, wherein at least one of the first SSB set and the second SSB set extends outside of the DRX ON duration;
    select, from multiple SSB sets including the first SSB set and the second SSB set, an SSB set for an SSB warm up procedure in connection with the DRX ON duration, wherein the code causes the UE to select the SSB set from the multiple SSB sets having a smallest time difference relative to the DRX ON duration and providing the smallest wakeup duration in the combination with the DRX ON duration; and
    wake up to measure the selected SSB.

20. The non-transitory computer-readable medium of claim 19, wherein reception of the first SSB set is configured to start before the DRX ON duration and reception of the second SSB set is configured to start after the DRX ON duration.

21. The non-transitory computer-readable medium of claim 20, wherein to select the SSB set for the SSB warm up procedure in connection with the DRX ON duration the code when executed by the at least one processor further cause the UE to:
    calculate a first time difference between an SSB start time of the first SSB set and a start time of the DRX ON duration;
    calculate a second time difference between an end time of the DRX ON duration and an SSB end time of the second SSB set and
    compare the first time difference to the second time difference to select the SSB set for the SSB warm up procedure.

22. The non-transitory computer-readable medium of claim 19, wherein the DRX configuration includes at least one parameter of the DRX ON duration, wherein the at least one parameter includes at least one of a start time, a length, or an end time of the DRX ON duration, or an SSB start time, an SSB length, or an SSB end time of a plurality of SSB sets including the first SSB set and the second SSB set.

* * * * *